(12) United States Patent
Lindblom et al.

(10) Patent No.: US 7,931,397 B2
(45) Date of Patent: Apr. 26, 2011

(54) UNDER PEDESTAL TANK ARRANGEMENT

(75) Inventors: Thomas G. Lindblom, Claremont, MN (US); Bryan S. Datema, Rochester, MN (US)

(73) Assignee: McNeilus Truck and Manufacturing, Inc., Dodge City, MN (US)

( * ) Notice: Subject to any disclaimer, the term of this patent is extended or adjusted under 35 U.S.C. 154(b) by 1094 days.

(21) Appl. No.: 11/679,373

(22) Filed: Feb. 27, 2007

(65) Prior Publication Data

US 2008/0205188 A1  Aug. 28, 2008

(51) Int. Cl.
*B28C 5/42* (2006.01)
*B28C 5/20* (2006.01)
*B62D 21/16* (2006.01)

(52) U.S. Cl. ............ 366/61; 220/563; 366/44; 366/136; 366/341

(58) Field of Classification Search ............... 366/44, 366/136, 137, 341, 61; 137/259; 206/514; 220/562–564, DIG. 13
See application file for complete search history.

(56) References Cited

U.S. PATENT DOCUMENTS

| | | | | |
|---|---|---|---|---|
| 640,118 A * | 12/1899 | Eck | .............. | 239/172 |
| 2,061,971 A * | 11/1936 | Leffiand | .............. | 4/554 |
| 2,676,003 A | 4/1954 | Oury | | |
| 3,054,525 A * | 9/1962 | Silvis | .............. | 280/838 |
| 3,190,621 A * | 6/1965 | Green et al. | .............. | 366/68 |
| 3,225,951 A * | 12/1965 | Poston et al. | .............. | 215/6 |
| 3,658,204 A * | 4/1972 | Bottger | .............. | 220/23.4 |
| 3,767,171 A * | 10/1973 | Dunmire | .............. | 366/30 |
| 3,847,241 A * | 11/1974 | Cameron et al. | .............. | 180/69.4 |
| 3,912,107 A * | 10/1975 | Baumann | .............. | 220/563 |
| 3,912,239 A | 10/1975 | Ries | | |
| 3,931,907 A * | 1/1976 | Henle | .............. | 220/530 |
| 4,043,127 A | 8/1977 | Kubik | | |
| 4,170,877 A * | 10/1979 | Pickering | .............. | 60/592 |
| 4,178,955 A * | 12/1979 | Dau | .............. | 137/264 |
| 4,592,478 A * | 6/1986 | Laconis | .............. | 220/23.83 |
| 4,993,457 A * | 2/1991 | Berfield | .............. | 137/899 |
| 5,022,547 A * | 6/1991 | Spangler et al. | .............. | 220/23.4 |
| 5,076,703 A | 12/1991 | Loefke et al. | | |
| 5,085,343 A * | 2/1992 | Scarr | .............. | 220/560.1 |
| 5,129,544 A * | 7/1992 | Jacobson et al. | .............. | 220/562 |
| 5,141,179 A * | 8/1992 | Gautier | .............. | 244/135 R |
| 5,186,324 A | 2/1993 | Brandon, Jr. | | |
| 5,301,829 A * | 4/1994 | Chrisco | .............. | 220/521 |
| 5,489,150 A * | 2/1996 | Whiteman, Jr. | .............. | 366/46 |
| 5,618,629 A * | 4/1997 | Takamatsu et al. | .............. | 428/475.5 |

(Continued)

OTHER PUBLICATIONS

International Search Report and Written Opinion, mailed Apr. 24, 2008.

*Primary Examiner* — David L Sorkin
*Assistant Examiner* — Andrew Janca
(74) *Attorney, Agent, or Firm* — Nikolai & Mersereau, P.A.; C. G. Mersereau

(57) ABSTRACT

Auxiliary fluid tanks associated with transit concrete mixing and dispensing systems are disclosed which include a hydraulic reservoir tank which is adapted to be stowed inside a mixing drum support pedestal. The hydraulic fluid reservoir tank further includes a shaped outer wall defining an enclosed inner space and includes one or more fluid discharge and return connections in the outer wall. The tank is also provided with an internal baffle shape in line with the fluid return connections such that it is addressed by returning hydraulic fluid and deflects and defuses the returning hydraulic fluid so that it thoroughly mixes with cooler reservoir fluid. An auxiliary water tank can also be nested beneath the hydraulic fluid reservoir tank under the hollow support pedestal.

9 Claims, 6 Drawing Sheets

U.S. PATENT DOCUMENTS

| | | | | |
|---|---|---|---|---|
| 5,673,940 A * | 10/1997 | Gaisford et al. | | 280/834 |
| 6,026,974 A * | 2/2000 | Burt | | 220/564 |
| 6,116,454 A | 9/2000 | Henderson et al. | | |
| 6,155,277 A * | 12/2000 | Barry | | 134/104.4 |
| 6,619,310 B2 | 9/2003 | Evanovich et al. | | |
| 6,619,317 B2 | 9/2003 | Evanovich et al. | | |
| 6,637,457 B2 * | 10/2003 | Evanovich et al. | | 137/574 |
| 6,659,685 B1 * | 12/2003 | Persson | | 404/133.1 |
| 6,758,497 B2 * | 7/2004 | Bergman | | 280/833 |
| 6,923,566 B2 * | 8/2005 | Willbee, Jr. | | 366/61 |
| 7,117,896 B2 * | 10/2006 | Eberling et al. | | 137/899 |
| 7,168,443 B2 * | 1/2007 | Smith et al. | | 137/355.12 |
| 7,370,665 B2 * | 5/2008 | Smith et al. | | 137/399 |
| 7,581,557 B2 * | 9/2009 | Lindblom et al. | | 137/259 |
| 7,730,903 B2 * | 6/2010 | Lindblom et al. | | 137/259 |
| 7,743,862 B2 * | 6/2010 | Togawa et al. | | 180/68.4 |
| 7,819,272 B2 * | 10/2010 | Sugiura | | 220/563 |
| 2001/0030191 A1 * | 10/2001 | Bopp et al. | | 220/23.4 |
| 2002/0196014 A1 * | 12/2002 | Iwase et al. | | 324/207.2 |
| 2003/0015536 A1 * | 1/2003 | Tekulve et al. | | 220/562 |
| 2007/0189108 A1 * | 8/2007 | Lindblom et al. | | 366/30 |
| 2008/0173372 A1 * | 7/2008 | Lindblom et al. | | 141/94 |
| 2008/0255310 A1 * | 10/2008 | Tsou et al. | | 525/178 |
| 2009/0101220 A1 * | 4/2009 | Mundy | | 137/575 |
| 2009/0154287 A1 * | 6/2009 | Lindblom et al. | | 366/40 |
| 2009/0283530 A1 * | 11/2009 | Lindblom et al. | | 220/564 |
| 2010/0258570 A1 * | 10/2010 | Koo et al. | | 220/562 |
| 2010/0276431 A1 * | 11/2010 | Schoenfuss et al. | | 220/562 |

* cited by examiner

UNDER PEDESTAL TANK ARRANGEMENT

BACKGROUND OF THE INVENTION

I. Field of the Invention

The present invention relates generally to on-board fluid systems including hydraulic systems carried by heavy machinery such as transit concrete mixing trucks and, more particularly, to a tank arrangement for such fluids.

II. Related Art

Vehicle-mounted hydraulically-powered equipment for various use has become quite common. As an example, hydraulic operating systems are used to turn mixing drums on transit concrete mixing and dispensing vehicles and to operate auxiliary axle assemblies including tag axles and other hydraulic devices associated with the vehicle.

In the hydraulic system of the type carried on vehicles, a metal hydraulic fluid reservoir tank is typically utilized to store the hydraulic fluid used in the system. The fluid is pumped from the tank and circulated to operate various hydraulic devices and thereafter returned to the tank. During the operation of hydraulic devices, oil is constantly circulating through the system and through the tank. As many hydraulic devices operate at very high pressures, oil returned to the tank is often at an elevated temperature in comparison to the supply oil in the tank or reservoir. Thus, thorough mixing of the return oil with the stored oil within the tank is desirable to efficiently cool the hot returning oil which avoids overheating and enables it to achieve a maximum service life.

While existing designs of hydraulic tanks such as that shown in U.S. Pat. No. 5,076,703, assigned to the same assignee as the present application, have proven satisfactory, tanks which promote better mixing between return and stored fluid have been continually sought. In addition, because of the limited space on board a vehicle, more compact and improved location for auxiliary fluid reservoir tanks also presents an advantage with respect to space occupied by on-board systems. In addition, improvements which reduce the weight and also the manufacturing cost of the reservoir storage tanks for such systems have been long term and highly desirable goals. Thus, there has remained a clear need in the art for advancements in auxiliary fluid reservoir tank designs which promote better internal circulation of hydraulic fluid during use, are lighter in weight and less expensive to manufacture and which have an improved service life.

SUMMARY OF THE INVENTION

By means of the present invention, there is provided advances in auxiliary fluid tanks associated with transit concrete mixing and dispensing systems in which a truck carries a chassis-mounted rotary mixing drum for mixing and dispensing concrete. A forward, generally hollow pedestal is provided on the chassis for supporting one end of the mixing drum for rotation. A hydraulic system to operate the drum and other devices is mounted on the truck. The hydraulic system includes a hydraulic reservoir tank which is adapted to be stowed inside the pedestal. The hydraulic fluid reservoir tank further includes a shaped outer wall defining an enclosed inner space and one or more fluid discharge and return connections in the outer wall. In accordance with an aspect of the invention, the tank is also provided with an internal baffle shape generally aligned with the fluid return connections such that it is addressed by returning hydraulic fluid and deflects and defuses the returning hydraulic fluid so that it thoroughly mixes with cooler reservoir fluid already in the hydraulic fluid reservoir tank to lower the average fluid temperature in the tank and thereby prevent overheating of the hydraulic fluid and tank structure. An auxiliary water tank can also be nested beneath the hydraulic fluid reservoir tank under the hollow support pedestal.

The internal baffle in the hydraulic fluid reservoir tank is preferably shaped by a corresponding recess in the outer wall of the hydraulic fluid reservoir tank and is in the shape of an arc or an arch which scatters and deflects and diffuses incoming hydraulic fluid into stored fluid on the other side of the arch.

In one embodiment, overlapping adjustable mounting brackets are provided for mounting and securing the hydraulic fluid reservoir tank in a raised relationship inside of the hollow pedestal and which by virtue of the overlapping nature of the brackets or slides facilitates installation or removal of the hydraulic fluid reservoir tank from inside the pedestal when desired. This also enables the placing of an auxiliary water tank nested beneath the hydraulic reservoir tank in the arch of the hydraulic reservoir tank beneath the drum pedestal.

Preferably, the hydraulic fluid reservoir tank is manufactured from a polymer material which is both abrasion and temperature resistant such as, for example, a polyamide. One preferred and successfully used polyamide is nylon 6. Any suitable polymeric material which is inert to the hydraulic fluid and which will withstand the maximum temperature of the fluid may be used, however.

BRIEF DESCRIPTION OF THE DRAWINGS

In the drawings wherein like numerals depict like parts throughout the same.

DETAILED DESCRIPTION

In accordance with the detailed description of the present invention, the particular embodiments illustrated and described are meant to be illustrative of aspects of the inventive concepts rather than limiting in any manner as it is believed that other structures may occur to those skilled in the art which remain well within the confines and scope of those inventive concepts.

Figure 1:
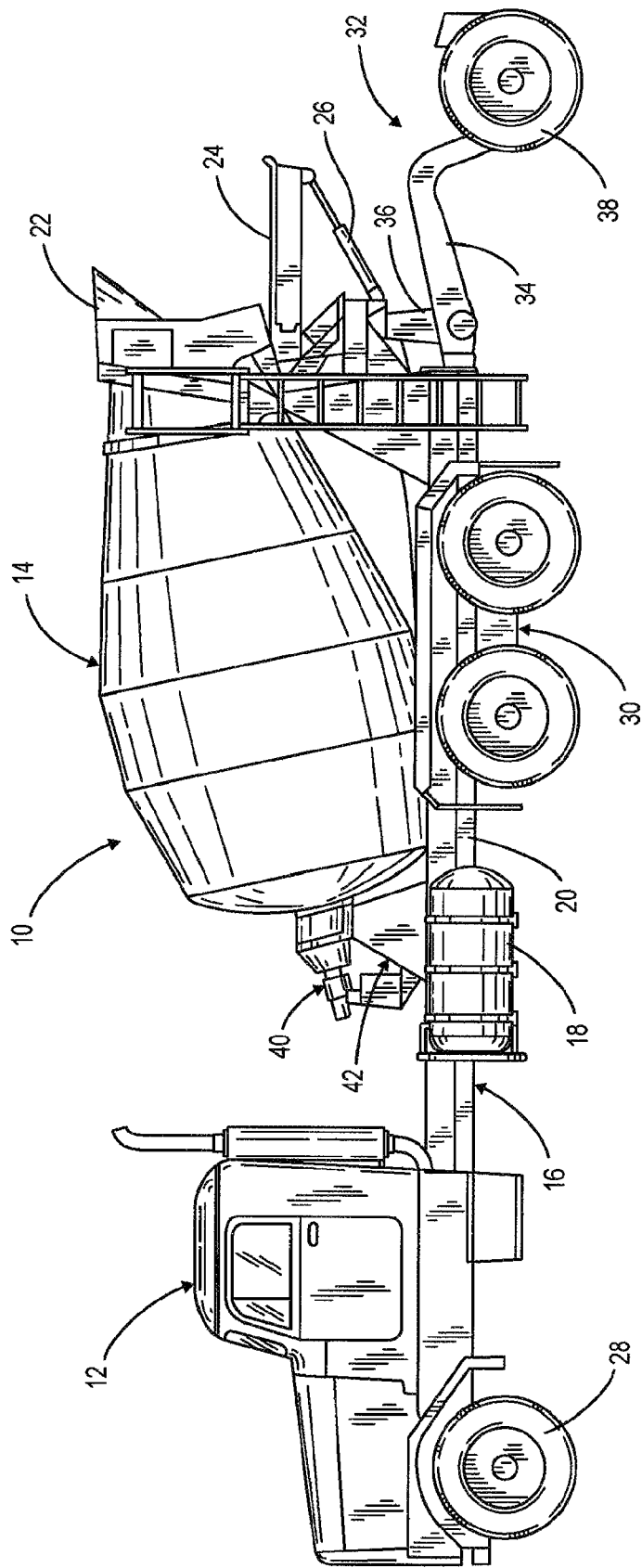
FIG. 1 is a side view of a transit concrete mixing vehicle of the class having an auxiliary fluid reservoir tank in accordance with the prior art but suitable for use with an under pedestal hydraulic fluid reservoir in accordance with the present invention.

FIG. 1 shows a transit concrete mixing truck generally at 10 having a cab 12 and a concrete mixing drum 14 mounted behind the cab and with the cab mounted on a chassis depicted at 16. In accordance with the prior art, an auxiliary water tank is shown at 18 attached to one of a pair of spaced parallel main chassis members or frame rails shown at 20. The mixing drum 14 is configured to receive materials to be mixed through a hopper 22 after which the materials are internally mixed thereafter dispensed through the rear of the drum for which a discharge chute 24 is shown maneuverable by a hydraulic cylinder shown at 26. The chassis is further provided with a steering axle 28 and a dual axle drive arrangement generally at 30. The base parallel main chassis members or frame rails as at 20 extend along the length of the work vehicle 10 and are connected to an auxiliary or tag axle arrangement, generally 32. The tag axle arrangement includes a pair of spaced generally parallel pivot arms 34 mounted on a torque tube 36. Each of the spaced parallel pivot arms 34 carries an auxiliary wheel as at 38.

The mixing drum 14 is mounted for rotation using a forward pedestal arrangement generally 40 which includes a heavy, generally hollow, support pedestal which is shown at 42. The pedestal as shown in FIG. 1 is suitable for use with the hydraulic fluid reservoir tank of the present invention.

Figure 2:
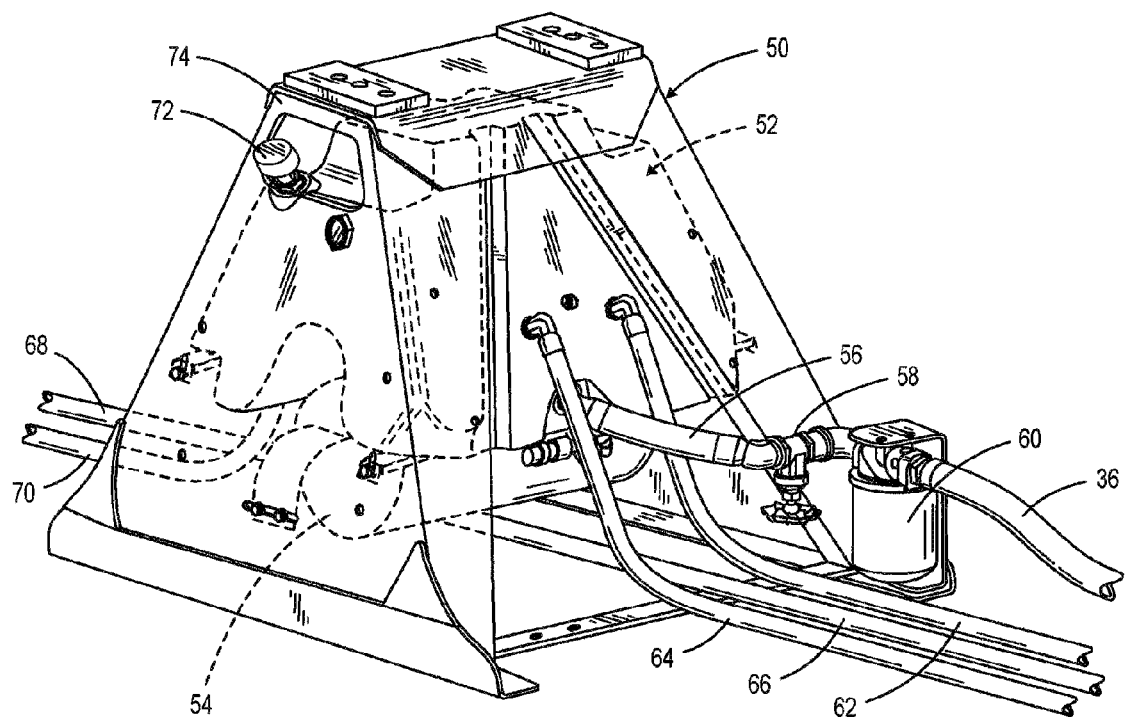
FIG. 2 is a greatly enlarged fragmentary perspective view showing a hydraulic fluid reservoir tank and auxiliary water tank in phantom nested beneath a concrete mixing drum pedestal with connections.

FIG. 2 is a fragmentary perspective representation that depicts a generally hollow drum support pedestal 50 with one embodiment of a hydraulic fluid reservoir tank 52 in accordance with the present invention shown in phantom mounted inside the pedestal and connected in a typical hydraulic system. An auxiliary air tank 54 is included, also shown mounted in the manner such that it nests inside a recess in the bottom of the hydraulic fluid reservoir tank also inside the pedestal. The pedestal is represented as transparent in this figure.

Certain hydraulic system connections are shown, including a hydraulic pump suction line 56 with shutoff valve 58 and suction line filter 60. A cylinder suction line is shown at 62 and a case drain line is depicted at 64. Other return lines are shown at 66, 68, 70. A vented fill cap assembly is shown at 72, which extends through an opening 74 in pedestal 50 (FIG. 3).

Figure 3:
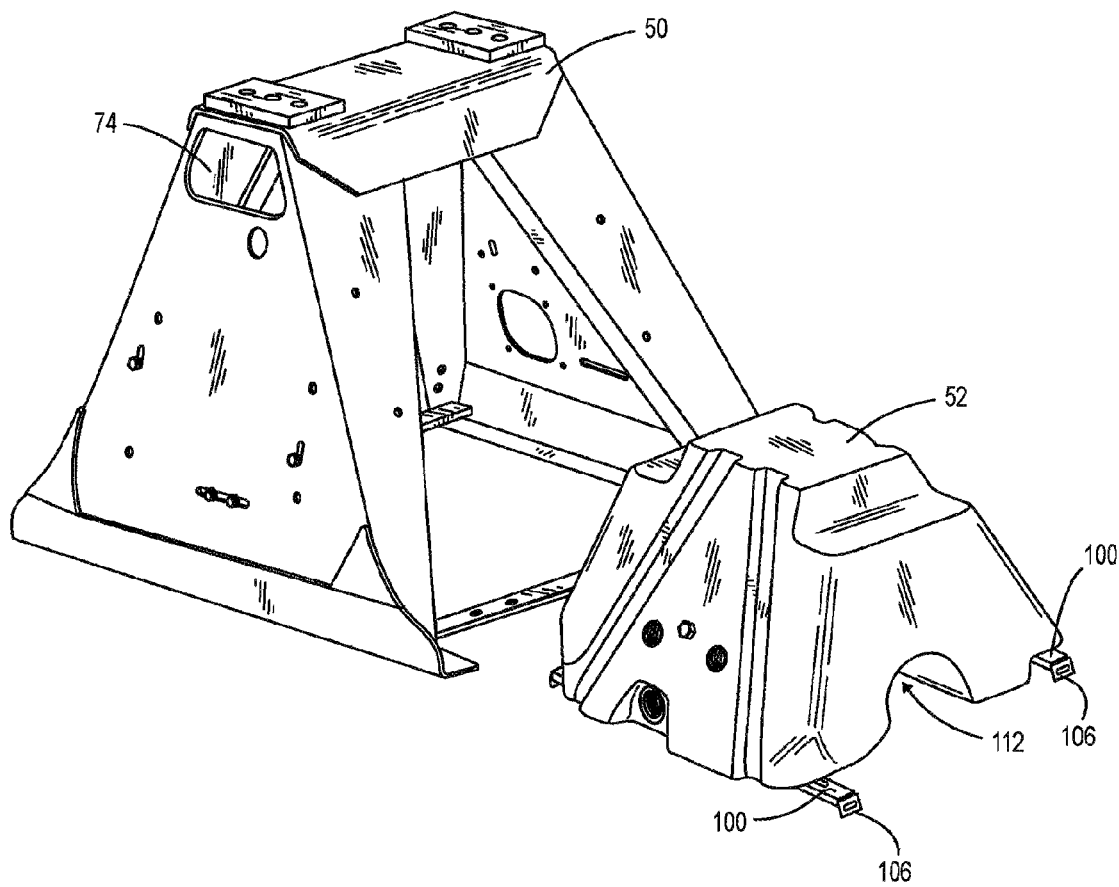
FIG. 3 is a perspective view of the pedestal and the hydraulic fluid reservoir tanks of FIG. 2 with the hydraulic fluid reservoir tank removed from the pedestal and rotated 90°.

Additional details of the hydraulic fluid reservoir tank 52 are depicted in the blown apart perspective view 5a and assembled perspective view of 5b and the perspective view of FIG. 3. Thus, the vented fill cap assembly 72 includes a tank vent cap 80, bushing 82, coupling 84, close nipple 86 and adapter 88. Plugs are shown at 90, 92, 94, 96. A site gauge is shown at 98.

In accordance with the invention, pairs of overlapping adjustable bracket supports are used to removably secure the hydraulic fluid reservoir tank inside the pedestal 50. Each pair includes an upper bracket as at 100 designated to overlay a lower bracket 102 and both brackets contain a pair of spaced longitudinal slots as at 104 and end mounting flange shapes 106. Overlapping bracket shapes are bolted to the tank through overlapping slots 104 as by bolts 108 with flat washers 110. The slots 104 enable the length of the overlapping brackets 100, 102 to be adjusted to fit the inside dimensions of the pedestal as required. Thus, the length may be shortened for easy removal or insertion of the tank into the pedestal and thereafter brackets length and to fasten to the pedestal using the flange shapes 106. The tank 52 may be inserted and rotated 90° prior to being secured in place with certain embodiments of pedestals.

The hydraulic fluid reservoir tank is generally shaped to be accommodated in the upper hollow volume of a transit concrete mixer drum support pedestal and is also provided with an arch-shaped bottom recess 112 which further defines an integral baffle 114 (FIG. 6) for deflecting and diffusing returning hydraulic fluid as will be explained.

Figure 6:
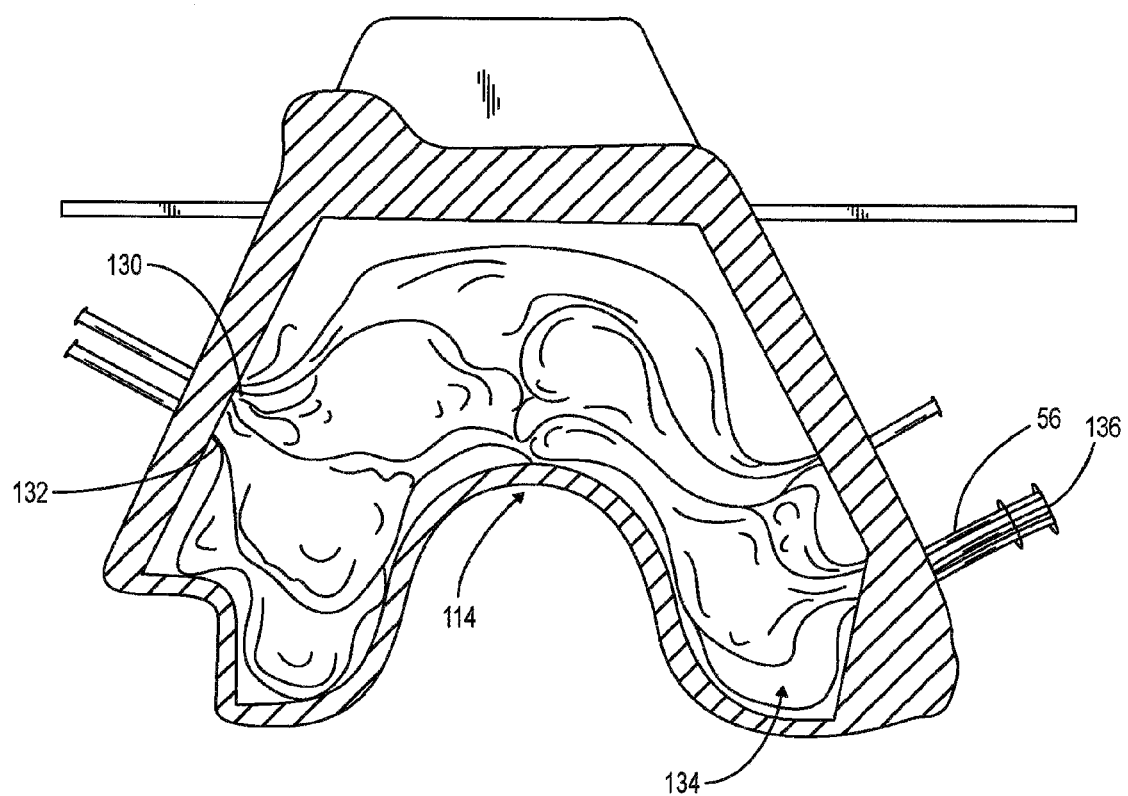
FIG. 6 is a view of the hydraulic fluid reservoir tank of FIG. 2 with parts cutaway showing the deflecting and diffusing of fluid returned to the tank.

FIG. 6 is a schematic representation showing a diffusion in mixing pattern with respect to streams of returning a relatively hot hydraulic fluid as at 130, 132 which mixes with cooler stored fluid inside the reservoir. Mixed fluid, which is cooler than the returning fluid, as shown in the area 134, is then ready to re-enter the hydraulic system through pump suction line 56 as shown by arrow 136.

Figure 4A:
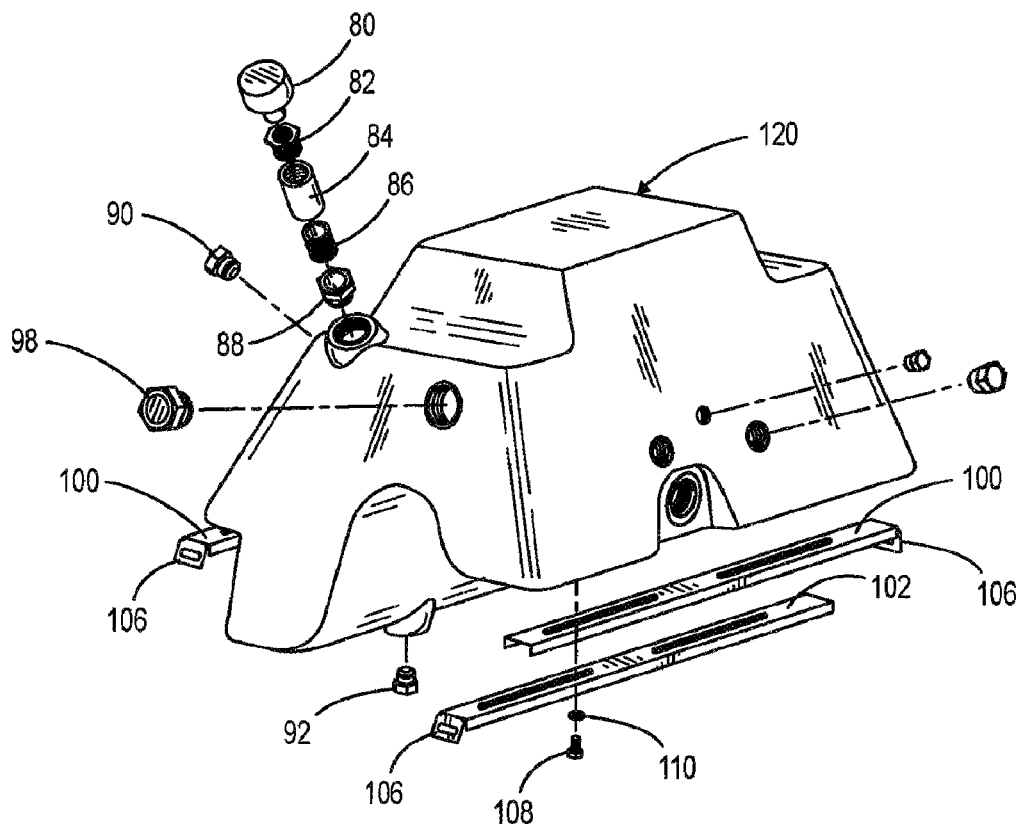
FIGS. 4a and 4b are exploded and assembled perspective views of an alternate embodiment of the hydraulic fluid reservoir tank of the invention.
Figure 4B:
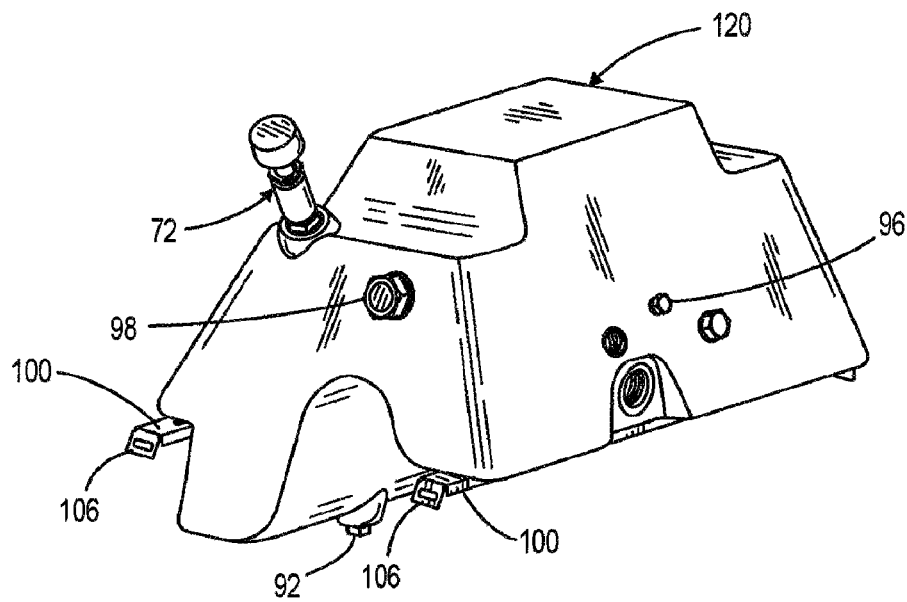
Figure 5A:
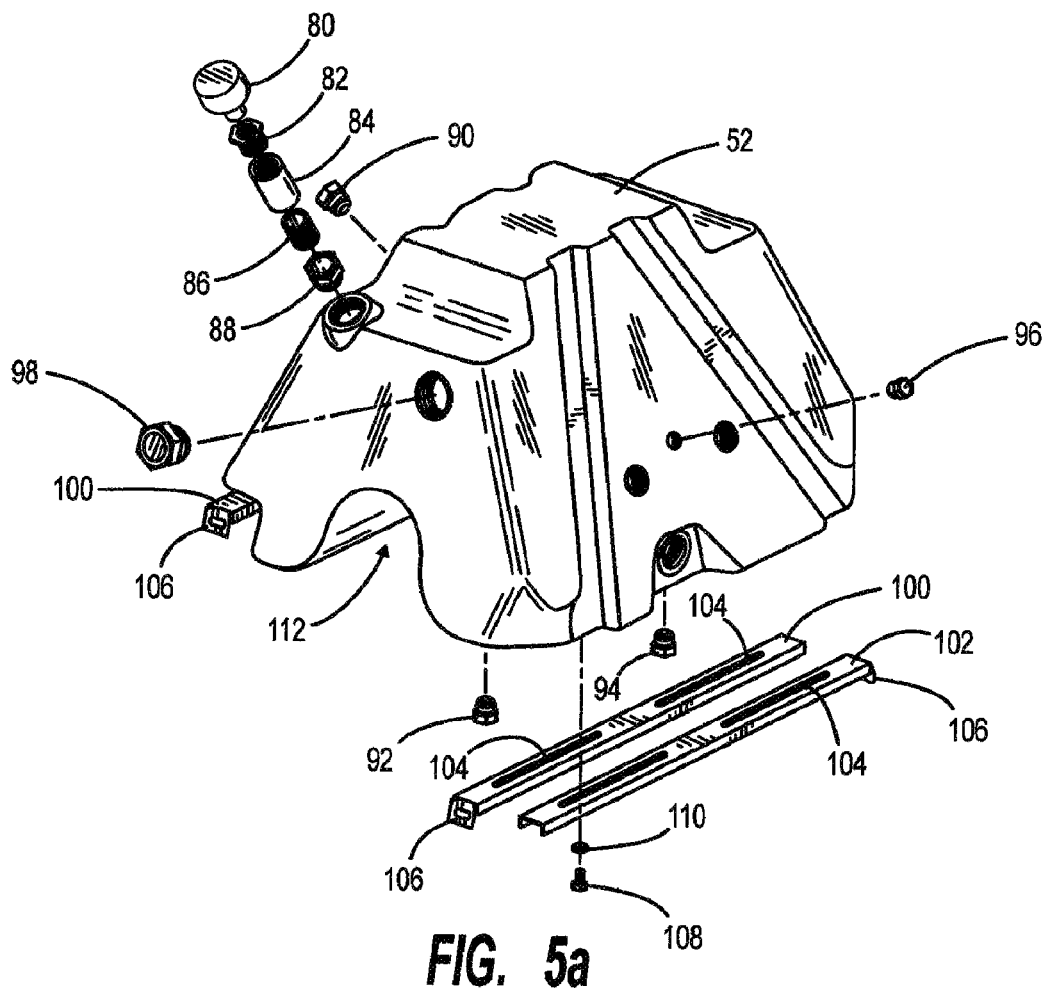
FIGS. 5a and 5b are exploded and assembled perspective views of the hydraulic fluid reservoir tank of FIG. 2.
Figure 5B:
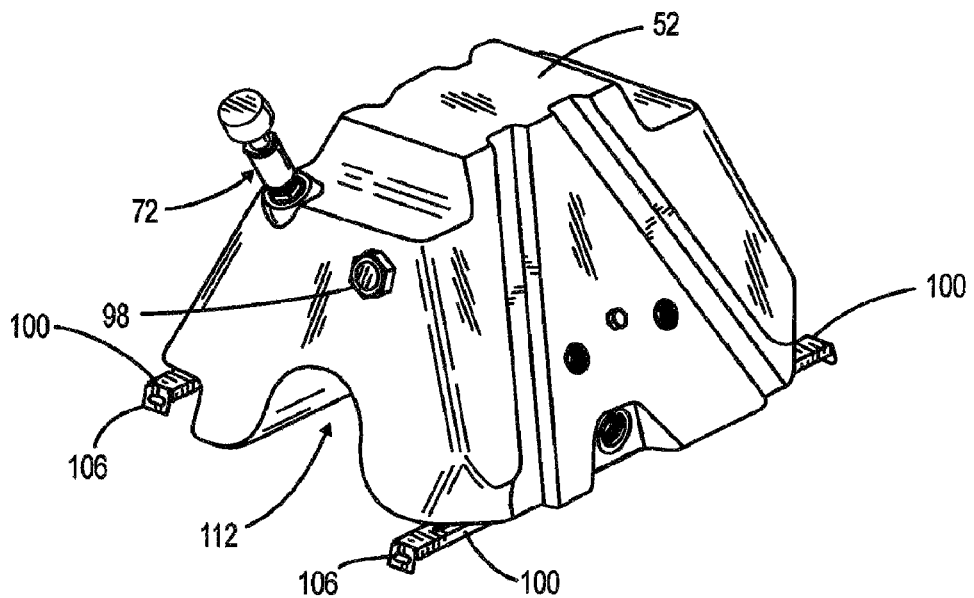

FIGS. 4a and 4b show an alternate embodiment of a hydraulic fluid reservoir tank 120 of a modified shape, but which uses the same mounting bracket arrangement, fill cap and side arrangement as the tank 52.

The hydraulic fluid reservoir tank of the invention is preferably molded from a rugged polymer material which is chemically inert to the contents and environment and which can withstand the temperature of the returning fluid. Polyamide materials have been preferred and particularly nylon 6 has been successfully used.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A transit concrete mixing and dispensing system comprising:
   (a) a truck including a chassis;
   (b) a rotary mixing drum for mixing and dispensing concrete mounted on said chassis;
   (c) a forward, generally hollow pedestal for supporting an end of said mixing drum for rotation;
   (d) a hydraulic system on said truck, said hydraulic system including a hydraulic fluid reservoir tank wherein said reservoir tank is adapted to be stowed inside said pedestal,
   (e) wherein said hydraulic fluid reservoir tank further comprises a shaped outer wall defining an enclosed inner space and containing a recess forming an internal baffle shape, one or more fluid return connections in said outer wall, said internal baffle shape being in the path of returning hydraulic fluid such that said returning hydraulic fluid is directed toward said internal baffle thereby forcing returning hydraulic fluid to mix with cooler reservoir fluid thereby lowering average fluid temperature; and
   (f) an auxiliary water tank nested in said recess beneath said hydraulic fluid reservoir tank.

2. A transit concrete mixing and dispensing system as in claim 1 wherein said internal baffle is in the form of an arch-shaped recess which deflects and diffuses incoming hydraulic fluid.

3. A transit concrete mixing and dispensing system as in claim 1 including mounting brackets for mounting and securing said hydraulic fluid reservoir tank inside said pedestal.

4. A transit concrete mixing and dispensing system as in claim 3 wherein said mounting brackets include overlapping slides that facilitate removal of said hydraulic fluid reservoir tank from inside said pedestal.

5. A transit concrete mixing and dispensing system as in claim 1 wherein said internal baffle is in the form of an arch-shaped recess defined by said outer wall of said hydraulic fluid reservoir tank and wherein said auxiliary water tank is nested in said arch.

6. A transit concrete mixing and dispensing system as in claim 1 wherein said hydraulic fluid reservoir tank is fabricated from a polymeric material.

7. A transit concrete mixing and dispensing system as in claim 6 wherein said polymeric material contains a polyamide.

8. A transit concrete mixing and dispensing system as in claim 7 wherein said polyamide is a nylon.

9. A transit concrete mixing and dispensing system as in claim 8 wherein said polyamide is nylon 6.

* * * * *